(12) United States Patent
Singer et al.

(10) Patent No.: US 10,672,074 B2
(45) Date of Patent: *Jun. 2, 2020

(54) SYSTEM AND METHOD FOR COORDINATING AUTOMATED AND SEMI-AUTOMATED TRADING TOOLS

(71) Applicant: Trading Technologies International, Inc., Chicago, IL (US)

(72) Inventors: Scott F. Singer, Green Oaks, IL (US); Mark Musgrave, Elmhurst, IL (US); Michael J. Burns, Riverside, IL (US)

(73) Assignee: Trading Technologies International, Inc., Chicago, IL (US)

( * ) Notice: Subject to any disclaimer, the term of this patent is extended or adjusted under 35 U.S.C. 154(b) by 93 days.

This patent is subject to a terminal disclaimer.

(21) Appl. No.: 16/103,650

(22) Filed: Aug. 14, 2018

(65) Prior Publication Data

US 2018/0357718 A1 Dec. 13, 2018

Related U.S. Application Data

(63) Continuation of application No. 13/471,352, filed on May 14, 2012, now Pat. No. 10,078,869, which is a
(Continued)

(51) Int. Cl.
*G06Q 40/04* (2012.01)
*G06Q 40/00* (2012.01)
(Continued)

(52) U.S. Cl.
CPC .......... *G06Q 40/04* (2013.01); *G06Q 40/00* (2013.01); *G06Q 40/025* (2013.01); *G06Q 40/06* (2013.01)

(58) Field of Classification Search
CPC ...... G06Q 40/06; G06Q 40/00; G06Q 40/025; G06Q 40/04
See application file for complete search history.

(56) References Cited

U.S. PATENT DOCUMENTS 5,508,731 A 4/1996 Kohorn
5,845,279 A 12/1998 Garofalakis et al.
(Continued)

FOREIGN PATENT DOCUMENTS

| CA | 2332235 A1 | 9/2000 | |
| WO | 2011/056399 A1 | 5/2011 | |
| WO | WO-2011056399 A1 * | 5/2011 | ............ G06Q 40/06 |

OTHER PUBLICATIONS

Brainbridge, Alex: Hotel Booking Process—Design & Usability Report, Feb. 2003, Travel UCD, pp. 1-51. (Year: 2003).*
(Continued)

*Primary Examiner* — Bijendra K Shrestha
(74) *Attorney, Agent, or Firm* — McDonnell Boehnen Hulbert & Berghoff LLP

(57) ABSTRACT

The present embodiments include methods, systems, and computer program products that provide tools for use in any type of electronic trading environment. In one aspect, leaning manager includes software that can be implemented on any type of computer device for tracking and/or coordinating the buying and selling of available market quantities by multiple automated or semi-automated trading tools. For instance, if more than one automated or semi-automated trading tool is leaning on the same tradeable object then the leaning manager may track and/or coordinate such action. The trading tools can use the tracked information and/or the allocated quantities and their prices to enhance their trading strategies.

14 Claims, 9 Drawing Sheets

Related U.S. Application Data continuation of application No. 12/420,710, filed on Apr. 8, 2009, now Pat. No. 8,214,280, which is a continuation of application No. 11/416,406, filed on May 2, 2006, now Pat. No. 7,536,344, which is a continuation of application No. 10/749,007, filed on Dec. 30, 2003, now Pat. No. 7,536,328.

(51) Int. Cl.
   *G06Q 40/02* (2012.01)
   *G06Q 40/06* (2012.01)

(56) References Cited

U.S. PATENT DOCUMENTS

| | | | |
|---|---|---|---|
| 6,021,397 | A | 2/2000 | Jones et al. |
| 6,026,388 | A | 2/2000 | Liddy et al. |
| 6,253,187 | B1 | 6/2001 | Fox |
| 6,628,629 | B1 | 9/2003 | Jorgensen |
| 7,260,554 | B2 | 8/2007 | Morano et al. |
| 7,315,838 | B2 | 1/2008 | Gershon |
| 7,315,839 | B2 | 1/2008 | McQuain |
| 7,437,325 | B2 | 10/2008 | Kemp, II et al. |
| 7,536,328 | B2 | 5/2009 | Singer et al. |
| 7,536,344 | B2 | 5/2009 | Singer et al. |
| 7,542,941 | B1 | 6/2009 | Cohen |
| 7,571,140 | B2 | 8/2009 | Weichert et al. |
| 7,813,995 | B2 | 10/2010 | Burns et al. |
| 7,996,296 | B2 | 8/2011 | Lange |
| 8,214,280 | B2 | 7/2012 | Singer et al. |
| 2001/0037275 | A1 | 11/2001 | Johnson et al. |
| 2001/0042785 | A1 | 11/2001 | Walker et al. |
| 2002/0147670 | A1 | 10/2002 | Lange |
| 2003/0055775 | A1 | 3/2003 | McQuain |
| 2003/0078865 | A1 | 4/2003 | Lee |
| 2003/0208430 | A1 | 11/2003 | Gershon |
| 2003/0236737 | A1 | 12/2003 | Kemp, II et al. |
| 2004/0117302 | A1 | 6/2004 | Weichert et al. |
| 2004/0249740 | A1 | 12/2004 | Romani |
| 2007/0100735 | A1* | 5/2007 | Kemp ............... G06Q 40/04 705/37 |
| 2009/0192933 | A1 | 7/2009 | Singer et al. |
| 2010/0241591 | A1 | 9/2010 | Fishbain |
| 2010/0245191 | A1 | 9/2010 | Castaneda et al. |
| 2012/0239546 | A1 | 9/2012 | Singer et al. |
| 2014/0143156 | A1* | 5/2014 | Darago ............... G06F 21/10 705/77 |

OTHER PUBLICATIONS

Dempster et al.: Areal-time adaptive trading system using genetic programming, 2001, Quantitative Finance, vol. 1, pp. 397-413 (Year: 2001).*

PR Newswire: TradeStation Securities announces launch of new TradeStation.com website, Mar. 4, 2003, pp. 1-5 (Year: 2003).*

Brainbridge, Alex: Hotel Booking Process—Design & Usability Report, Feb. 2003, Travel UCO, pp. 1-51. (Year: 2003).

International Search Report and Written Opinion of International Application No. PCT/US2004/043582 dated Feb. 8, 2007 (dated Feb. 28, 2007).

Krebsbach, K., "Trading Orc's Liquidator Floods the Street" [online], *Bank Technology News*, New York: Dec. 2003, vol. 16, Iss. 12, p. 1. [Retrieved on Sep. 24, 2001] from the Internet: on http://proquest.umi.com/, ProQuest Document ID: 469993761.

"TradeStation Securities Announces Launch of New TradeStations.com Web Site" [online], *PR Newswire*, New York: Mar. 4, 2003, p. 1. [Retrieved on Sep. 4, 2008] from the Internet: on http://proquest.umi.com/, ProQuest Document ID: 298571441.

* cited by examiner

Market Information Table 200

| Price Level | Available Quantity | Reserved Quantity | Reserved IDs |
|---|---|---|---|
| | | | |
| ---- | ---- | ---- | ---- |
| | | | |

Rows 202
Columns 204

FIG. 2

| Buy Side Market Information | | |
|---|---|---|
| Price Level | Available Quantity | Reserved Quantity | Reserved IDs |
| 50 | 115 | 115 | A, B |
| 49 | 120 | 20 | B |
| 47 | 40 | | |
| 44 | 10 | | |
| 43 | 25 | | |

FIG. 7

| Buy Side Market Information ||||
| Price Level | Available Quantity | Reserved Quantity | Reserved IDs |
| --- | --- | --- | --- |
| 50 | 75 | 75 | A |
| 49 | 120 | 60 | A, B |
| 47 | 40 | | |
| 44 | 10 | | |
| 43 | 25 | | |

FIG. 8

Buy Side Market Information — 500

| Price Level | Available Quantity | Reserved Quantity | Reserved IDs |
|---|---|---|---|
| 50 | 25 | 25 | A |
| 49 | 120 | 90 | A |
| 47 | 40 | | |
| 44 | 10 | | |
| 43 | 25 | | |

FIG. 9

SYSTEM AND METHOD FOR COORDINATING AUTOMATED AND SEMI-AUTOMATED TRADING TOOLS

CROSS-REFERENCE TO RELATED APPLICATIONS

The present application is a continuation of U.S. patent application Ser. No. 13/471,352, filed May 14, 2012, now U.S. Pat. No. 10,078,869, which is a continuation of U.S. patent application Ser. No. 12/420,710, filed Apr. 8, 2009, now U.S. Pat. No. 8,214,280, which is a continuation of U.S. patent application Ser. No. 11/416,406, filed May 2, 2006, now U.S. Pat. No. 7,536,344, which is a continuation of U.S. patent application Ser. No. 10/749,007, filed Dec. 30, 2003, now U.S. Pat. No. 7,536,328. The entire contents of each of these applications are herewith incorporated by reference into the present application for all purposes.

FIELD OF INVENTION

The present embodiments relate to a computer-based method and system for use in electronic trading, and in particular, for use in coordinating trading tools that trade any product with a quantity and/or price.

BACKGROUND

Trading methods have evolved from a manually intensive process to a technology enabled, electronic platform. Advances in technology are having an increasingly large and broad impact on trading and the way in which exchanges conduct business. What was previously seen as just a supplement to the traditional pit trading, electronic trading platforms continue to increase in importance and popularity. The advent of electronic trading has meant that a customer can be in virtually direct contact with the market, from practically anywhere in the world, performing near real-time transactions.

To access a market to trade in, buyers and sellers (or traders) log onto an electronic exchange through their user terminals, which are connected to the exchange over a network. Examples of a user terminal include a personal computer, laptop, or workstation. The user terminal may implement a Microsoft Windows-type operating system to provide a graphical user interface based on windowed regions on the user terminal screen and an input device such as a mouse and keyboard. Certainly, the user terminal may include other types of modern computing devices, input devices and might use other types of operating systems such as a Macintosh or Unix-type operating system to trade in a market.

Sometimes traders use software running on the user terminals to create specialized interactive trading screens. Oftentimes, the interactive trading screens enable people to manually enter orders into the market, obtain market quotes, and monitor positions. Of course, the range and quality of features available varies according to the specific software application being run.

In addition to, or in place of, manual-style trading, traders might use automated or semi-automated software to assist them in executing their trading strategies. As such, there are all sorts of software tools available that traders can use to automate or semi-automate the way that they trade. In fact, Trading Technologies International, Inc. of Chicago, Ill. provides automated or semi-automated trading tools that a trader might use to enhance their trading. For example, the TT Autospreader and the TT Autotrader are examples of software tools provided by Trading Technologies International, Inc. that automate aspects of trading such as automated order management and automatic execution of basic-to-complex trading strategies, just to name a few. Trading tools can be flexible, and therefore, they may be open to the trader for programming, or they may exist in a black-box form. Traders may simultaneously use one or more different types of automated or semi-automated trading tools. In addition, traders may have more than one session running a particular trading tool.

There are many instances when an automated or semi-automated trading tool is watching or leaning on a tradeable object's available quantities and prices, and plan to buy or sell them as soon as a certain event occurs. In other words, the trading tool may use this "leaned on" market information in implementing its trading strategy. Once the event occurs, for example, the trading tool might then send an order to buy or sell the "leaned on" tradeable object to complete a particular transaction. However, unbeknownst to the trading tool, another trading tool might be interested in the same quantity for the same tradeable object. When both events occur such that both of the trading tools act on the same "leaned on" tradeable object, a conflict may exist. This conflict may risk, among other things, one or more incomplete transactions and/or a potential unexpected loss of money for the trader.

In electronic trading systems, such as the one described above or in some other type of computer-based trading system, it is desirable for a trader to have tools in a software, hardware, or software/hardware form that can assist the trader in executing his or her trading strategy while reducing the risks associated with running multiple sessions of automated or semi-automated trading tools.

BRIEF DESCRIPTION OF THE DRAWINGS

Many aspects of the present embodiments may be better understood with reference to the following drawings. The components in the drawings are not necessarily to scale, emphasis instead being placed upon illustrating example embodiments.

FIG. 2 shows an example table used to store market information for a tradeable object and used in allocating market quantities to multiple automated or semi-automated trading tools;

FIGS. 4-9 show an example implementation of a preferred embodiment, and in particular, show two sessions that are performing spread trading.

DETAILED DESCRIPTION

I. Overview

Figure 1:
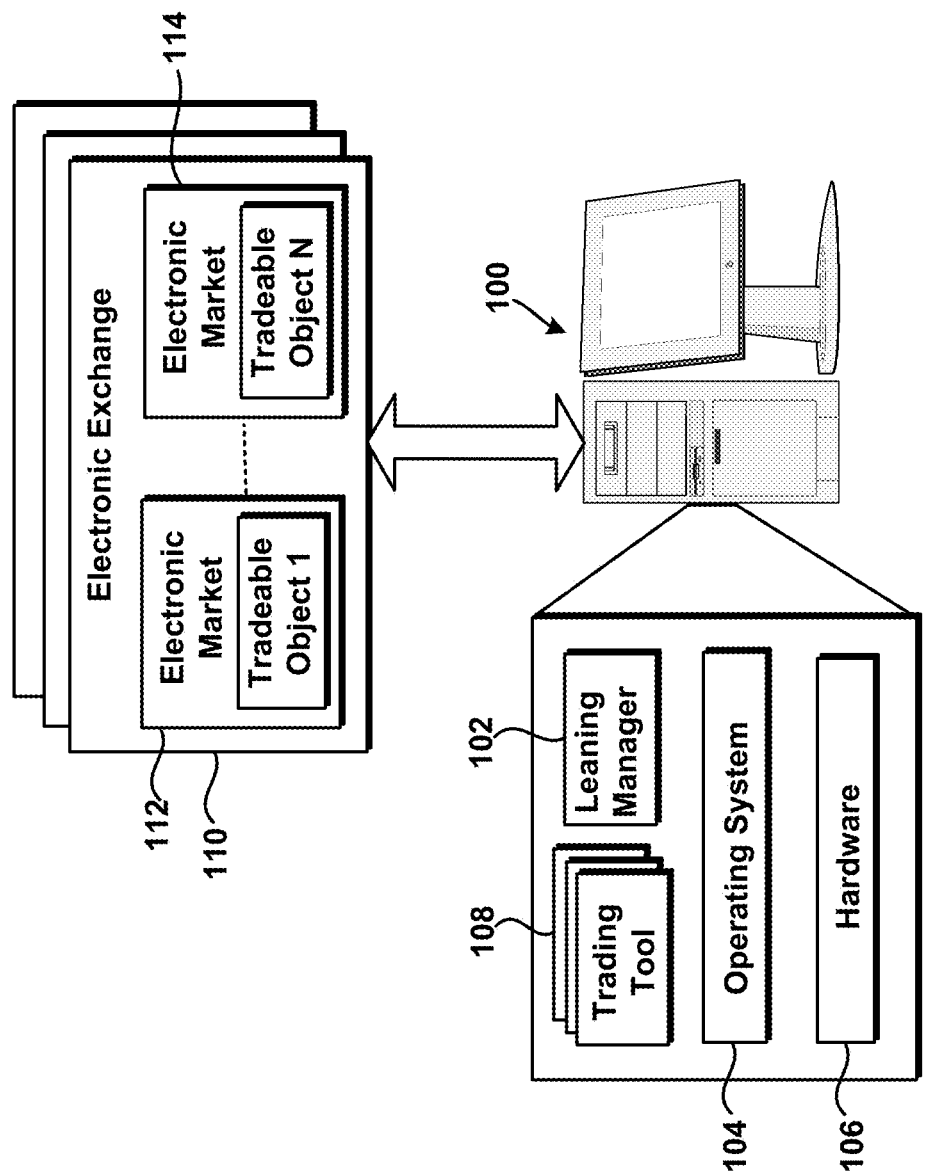
FIG. 1 shows an example system diagram that illustrates a computer device used to implement a preferred embodiment, and in particular, shows a leaning manager that performs the coordination of buying and selling tradeable objects amongst multiple automated or semi-automated trading tool sessions.

The present embodiments include methods, systems, and computer program products that provide tools for use in electronic trading, and they may be put to advantageous use in any type of electronic trading environment. By using the present embodiments, for example, the risk associated with leaning on a tradeable object that has been already accounted for may be reduced. In other words, the preferred embodiments may prevent automated or semi-automated trading tools from leaning on a tradeable object that might soon become "oversold" or "overbought."

As mentioned in the background section, there are many scenarios when a trading strategy may be watching or leaning on a tradeable object's available quantities and prices, and plan to buy or sell them as soon as a particular event occurs. Unfortunately, conventional trading tools are programmed to look only at the current market conditions and implement their trading strategies accordingly. As such, the conventional trading tools do not take into account the other trading tool's actions, which may result, among other things, in leaning on what could become an "oversold" or "overbought" tradeable object.

According to the preferred embodiments, a leaning manager is provided to include a software module that can be implemented on any type of computer device for coordinating the use of market information "leaned on" by multiple automated and semi-automated trading tool sessions. The leaning manager may include a stand-alone software module that works with an existing trading tool, or the leaning manager may be integrated into the software application of the trading tool itself. The leaning manager or portions thereof, may also be installed at gateways or other intermediary devices to perform the coordination over a broad range of user terminals and traders, if so desired.

In accordance with the preferred embodiments, the leaning manager tracks the tradeable object that is being "leaned on" by the trading tools in an effort to coordinate their actions. In addition, the leaning manager may limit the trading tools from leaning on the same tradeable object in their trading strategy formulations. As described below with reference to the figures, if more than one automated or semi-automated trading tool is leaning on the same tradeable object, then the leaning manager may coordinate such action by allocating the desired quantities amongst the trading tools. Then, for example, the trading tools can use the allocated quantities and their prices in more precisely formulating their trading strategies.

In the following description, for purposes of explanation, specific examples are set forth to provide some working illustrations of various embodiments. More specifically, these examples use an autospreader, which is an automated spread trading tool. For more details regarding the operation of the autospreader, please refer to U.S. patent application Ser. No. 10/137,979, entitled, "A System and Method for Performing Automatic Spread Trading" the content of which is incorporated by reference herein. By way of illustration, an example of another automated tool is the autotrader, which is, described in U.S. patent application Ser. No. 10/284,584, entitled, "System and Method for Automated Trading" the content of which is incorporated by reference herein. However, it will be apparent to one skilled in the art that these specific details are not required to practice the present invention.

These embodiments, and others described in greater detail herein, whether used individually or collectively, provide the trader with the ability to fine tune their trading strategies according to other relevant and important factors, in addition to just the current market conditions. There are many other systems, methods, features, and advantages of the present embodiments will be or become apparent to one with skill in the art upon examination of the following drawings and description. It is intended that all such additional systems, methods, features, and advantages be within the scope of the present invention, and be protected by the accompanying claims.

II. System Architecture

A. Computer System

As will be appreciated by one of ordinary skill in the art, the embodiments may be operated in an entirely software environment, in an entirely hardware environment, or in a combination thereof. For example, in a software environment, the embodiments may take the form of a computer program product that is stored on a computer readable storage medium and is executed by a suitable instruction execution system. Any suitable computer readable storage medium may be utilized including hard disks, CD-ROMs, optical storage devices, or magnetic storage devices, for example. In a hardware environment, the preferred embodiments may be implemented using any technology or hardware components such as application specific integrated circuits (ASICs).

With reference to FIG. 1, computer device 100 preferably includes, among other things, at least a processor and a storage mechanism (both of which are not shown in the figure, but are well-known computer components) for storing and performing the functions described herein. Computer device 100 is illustrated in FIG. 1 to have layers that are intended to define different program modules that may be used to implement the functions described herein. As shown in FIG. 1, from the bottom layer to the top layer, the layers include hardware layer 106, operating system 104, leaning manager 102 and one or more trading tools 108. In addition, computer device 100 may operate in a networked environment using logical connections and intermediary devices, such as gateways, to one or more electronic exchanges generally indicated as 110. For purposes of illustrating aspects of the preferred embodiments, intermediary devices have been left out of the figure.

Those skilled in the art will appreciate that the present invention may be practiced with other computer system configurations, including hand-held devices, multiprocessor systems, microprocessor-based or programmable consumer electronics, minicomputers, mainframe computers, and so on. In addition, the present invention may be practiced in distributed computing environments where tasks are performed by remote processing devices that are linked through a communications network.

Hardware layer 106 may include special programs or drivers to interface peripheral input devices with operating system 104. In particular, hardware layer 106 may translate between electrical signals generated by an input device (examples are not shown in the figure) and the programming languages of operating system 104. Input devices may include a mouse, keyboard, game pad, virtual glove, joystick, or trackball, for example. In addition, hardware layer 106 may include a network connection interface that will allow computer device 100 to link to one or more of the electronic exchanges 110 through one or more networks.

For sake of illustration, a network represents a group of computers and/or associated devices that are connected by communications medium or facilities. A network can be as small as a LAN (local area network) consisting of a few computers, printers, and/or other devices, or it can consist of many small and large computers distributed over a vast geographic area (WAN or wide area network), or it can consist of both types of networks (both LAN and WAN). There are many different types of networks, combinations of network types, and network environments known in the art that can be used to link computer device 100 to electronic exchange 110. Such networking environments are commonplace in homes, offices, enterprise-wide computer networks, intranets, and the Internet, for example. Intermediate computer devices such as gateways (not shown) may be used to receive market information from one or more of the electronic exchanges 110 and convert the market information to a format compatible with the protocols used by computer device 100, and vice-versa, using conversion techniques known in the art.

Operating system 104 may be used to manage hardware layer 106 and the software resources of computer device 100. General functions of operating system 104 might include processor management, memory management, device management, storage management, application interface, and user interface. Any type of operating system 104 may be used to implement the present embodiments, and examples of common operating systems include Microsoft Windows family of operating systems, the UNIX family of operating systems, and the Macintosh operating systems. However, it will be recognized by those of ordinary skill in the art that the added complexity of an operating system may not be necessary to perform the functions herein. For example, an operating system may not be needed if the present embodiments were implemented in hardware using, for example, hardware components such as ASICs.

Leaning manager 102 is preferably a software application that interfaces with operating system 104 to coordinate automated or semi-automated trading tools. Leaning manager 102 is preferably implemented by using a C or C++ based software program, though other suitable program languages can be utilized such as Java. Leaning manager 102 may be configured to work with any type of automated or semi-automated trading tool 108 to provide the functionality described herein.

In an alternative embodiment, functions of leaning manager 102 may be integrated into the software application of trading tool 108 (this integration is not shown). Also, functions of the leaning manager 102 may be implemented at an intermediary device such as a gateway to coordinate a broad range of trading tools running on computer devices connected thereto (also not shown).

Leaning manager 102 may be stored in a computer program product and loaded into computer device 100 using a removable storage drive, a hard drive, or a communications interface such as a serial port or USB connection. Alternatively, the computer program product may be downloaded to computer device 100 over a network. The leaning manager 102, when executed by the processor, causes the processor to perform the functions of the invention as described herein.

B. Accessing an Electronic Exchange

By way of illustration, an electronic exchange is a central marketplace with established rules and regulations where buyers and sellers meet to trade. Electronic exchanges operate by an electronic or telecommunications network instead of a traditional trading floor to facilitate trading in an efficient, versatile, anonymous, and functionally rich way. Electronic exchanges are generally based on computers that perform, among other things, order matching, maintaining order books and positions, and price information. Some examples of electronic exchanges include the London International Financial Futures and Options Exchange (LIFFE), the Chicago Board of Trade (CBOT), the Chicago Mercantile Exchange (CME), the Exchange Electronic Trading (Xetra, a German stock exchange), and the European Exchange (Eurex). Electronic exchanges might also refer to other software and/or hardware based facilities, which include basic to complex systems that automatically match incoming orders.

Each of the electronic exchanges 110 may host one or more electronic markets 112 and 114 such that each electronic market provides a place to trade a tradeable object. For example, the Chicago Mercantile Exchange is the electronic exchange, the S&P 500 pit would be known as the electronic market, and the S&P 500's themselves are the tradable objects. As used herein, the term "tradable objects," refers simply to anything that can be traded with a quantity and/or price. It includes, but is not limited to, all types of tradable objects such as financial products, which can include, for example, stocks, options, bonds, futures, currency, and warrants, as well as funds, derivatives and collections of the foregoing, and all types of commodities, such as grains, energy, and metals. The tradable object may be "real," such as products that are listed by an exchange for trading, or "synthetic," such as a combination of real products that is created by the user. A tradable object could actually be a combination of other tradable objects, such as a class of tradable objects.

Each of the electronic markets 112, 114 may provide similar types of market information to computer device 100. At the very least, market information preferably includes data that represents the inside market. The inside market is the lowest sell price (best ask) and the highest buy price (best bid) available in the market. Market information may also include market depth. As used herein, market depth refers to quantities available at the inside market and can refer to quantities available at other price levels above or below the inside market. The quantity available at a given price level is usually provided by the electronic markets in aggregate sums, although the present embodiments may also work with market information feeds that provide discrete order information. The extent of the market depth available to a trader usually depends on the electronic exchange. For instance, some electronic exchanges provide market depth for all (or most) price levels, while some provide only quantities associated with the inside market, and others may provide no market depth at all. Additionally, electronic exchanges 110 can offer other types of market information such as the last traded price (LTP), the last traded quantity (LTQ), and order fill information Computer device 100 may interface with one or more electronic exchanges 110 in a networked environment to receive market information for one or more tradeable objects, and according to this example, for "Tradeable Object 1" through "Tradeable Object N." Therefore, computer device 100 can receive market information for those tradeable objects being traded on that electronic exchange. As shown in FIG. 1, computer device 100 can log on and off one or more electronic exchanges 110, subscribe to the service that will send market information, and then participate in trading any number of tradable objects.

II. System Function

Leaning manager 102 may be executed upon command by loading the machine code of the program into memory and then performing the instructions. The command may be given at any time by any event, such as for example, by opening of a trading tool or by a user manually selecting an option. As such, according to one embodiment, leaning manager 102 may generate a collection of records for use in storing certain pieces of information that are relevant in performing the functions described herein. The records may consist of tables in a relational database management system. In an alternative embodiment, the records could consist of any type of data structure to provide an organizational scheme. It should be understood that this is one embodiment for carrying out the functions described herein, and that the present invention is not limited to this particular embodiment.

A. Market Information Table

In an embodiment, when market information is received for a particular tradeable object that is being leaned on, leaning manager 102 generates a market information table. FIG. 2 shows an example market information table, generally indicated as 200, which may be used to store market information for a particular tradeable object. Table 200 may be generated for each tradeable object separately, or alternatively, one table may service more than one tradeable object given that an extra column is added to distinguish the tradeable objects.

Table 200 is representative of a table storage arrangement comprising rows 202 and columns 204. Rows 202 define price levels for orders to buy/sell the tradeable object and columns 204 show different items of interest that are associated with the price levels. The number of rows 202 may depend on the level of market depth that is provided by an electronic market in their data feed. The number of columns 204 may be increased or decreased, depending on the desired functionality. For example, if the market information table is programmed to collect market information for both the buy side and the sell side of the market, then another column may be added to table 200 to indicate if the price level corresponds to a bid or an offer. In another example, a column may be added to store priority information, which could be used to prioritize the reservation requests.

As shown in the drawing, table 200 includes four columns, a "Price Level" column, an "Available Quantity" column, a "Reserved Quantity" column, and a "Reserved Ids" column. The price level column indicates the prices for which orders are resting in a market. In other words, they represent prices in the market's order book. The available quantity column indicates the quantities available at those prices. The reserved quantity column provides a listing of the quantities that are reserved by (or allocated to) the trading tools. According to one embodiment, the value in the reserved quantity column may not exceed the value in the available quantity column. Alternatively, the value in the reserved quantity column may exceed the value in the available quantity column if, for example, the leaning manager 102 is programmed to allow trading tools to reserve potential future quantities or the leaning manager 102 is programmed to allow some overlap of reservations. The reserved Ids column indicates the trading tools that are presently reserving quantity to lean on. That is, if a trading tool is reserving a quantity at a particular price level, the ID (identification label) of that trading tool is placed in the reserved Ids column. Note that each trading tool receives an ID, more of which is described below.

B. Populating Portions of a Market Information Table

In one embodiment, as market information is received, information pertaining to orders in the market order book are used to populate the price level and available quantity columns in table 200. Market information may arrive in various types of message formats, depending on the electronic exchange and their specification. Examples of message types may include best buy and/or best sell price messages, messages that indicate quantity modifications at the best prices, messages that indicate quantity modifications to other prices besides the best prices, status messages, opening price messages, and so forth. Regardless of how the market information is received or what format is used, leaning manager 102 preferably acts upon the market information by extracting out the available quantity and price information, and then stores the relevant information in table 200. As new market information is received, the contents of table 200 are preferably updated.

C. Request Table

Figure 3:
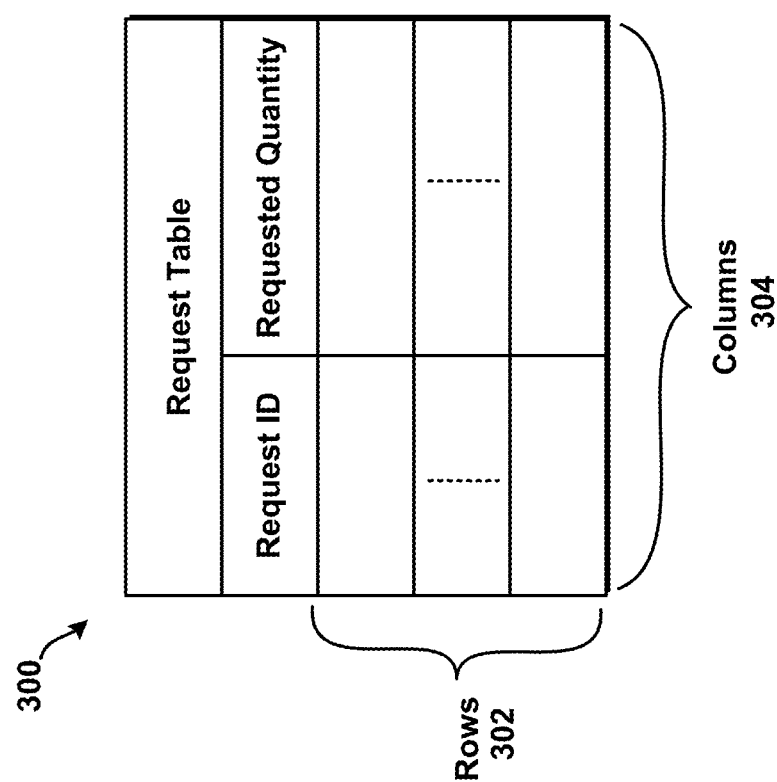
FIG. 3 shows an example table used to store requests from one or more automated or semi-automated trading tools for quantity for a tradeable object.

Trading tools that wish to lean on a particular tradeable object may make a request for a particular quantity. In one embodiment, when a request to reserve quantity is received for a particular tradeable object, leaning manager 102 generates a request table. FIG. 3 shows a sample table 300 that may be used to store requests for quantity of a particular tradeable object. As shown in FIG. 3, table 300 represents a table storage arrangement comprising rows 302 and columns 304. Rows 302 define request IDs for trading tools that are requesting an associated quantity for a tradeable object. According to table 300, the "Request ID" column provides the identification of the trading tool performing the request and "Requested Quantity" column provides the amount that is requested. A request table may be generated for each tradeable object separately, or alternatively, one table may service more than one tradeable object giving that an extra column is added to distinguish the tradeable objects. Of course, it should also be recognized that request table may be integrated into table 200, if so desired.

D. Populating Portions of a Request Table

As previously described, computer device 100 might be running an automated or semi-automated trading tool. Preferably, a user can operate as many "sessions" of the automated tool as necessary to achieve his or her trading strategy. Thus, for example, if a trader wishes to use an automatic spread trading tool, he/she might select one or more tradeable objects in order for the automatic spread trading tool to generate a synthetic tradeable object. Preferably, the trader can do this again, therefore having the automatic spread trading tool generate a second synthetic tradeable object. The trader may do this repeatedly. Each time this happens, the trader is preferably starting a new session with the automatic spread trading tool. In addition, computer device 100 might be running other types of automated or semi-automated trading tools. Similar to the automatic spread trading tool above, multiple "sessions" of the trading tools may be run and coordinated by the leaning manager 102. Moreover, a group of traders might be running one or more different kinds of trading tools, in which, leaning manager 102 may be programmed to coordinate the trading tools amongst the group.

In one embodiment, a session may be initiated by the submission of one order, and as such, when a second order is submitted, then a second "session" is initiated. For example, if a trader is using a particular trading tool and he attempts to buy a spread, then a first session is initiated. If the trader, using the same trading tool, attempts to buy the same spread again, then a second session is preferably initiated. Accordingly, a particular trading tool is made "aware" of its own orders and the tradeable objects that are being leaned on, so as to reduce the likelihood of overbuying or overselling them.

In one embodiment, each session is assigned an ID or identification that uniquely identifies the session to the leaning manager 102. When a session requests a quantity for use in executing its programmed trading strategy, it may do so by sending a message to leaning manager 102 requesting a certain quantity of the tradeable object. In response, leaning manager 102 may populate table 300 to record the request. Preferably, leaning manager 102 records the request in first come, first serve (FIFO) basis and prioritizes the requests in that order. Alternatively, other types of priority schemes may be used in place of a FIFO system such as a pro-rata system, which is described more below.

D. Example Process of Leaning on a Tradeable Object

In a preferred embodiment, if data is changed in table 300, then the change is reflected in table 200. In other words, when a request is added, the request is translated into a reserved quantity along with its ID in table 200. Sessions may continue to request quantity, and leaning manager 102 may continue to make the reservations for available quantities. In one embodiment, leaning manager 102 receives requests and makes reservations one session at a time.

In addition, leaning manager 102 preferably sends a message back to the session indicating the best price for which quantity is currently available (and not reserved or allocated out). Thus, for example, a session may need a certain quantity to implement its trading strategy and can request this amount from leaning manager 102. Essentially, the session is asking leaning manager 102 "At what price can I get this quantity for?" The request is entered into request table 300. Then, leaning manager 102 checks table 200 for the available quantities, preferably starting at the best prices, and responds to the session. Sometimes, leaning manager 102 has to look to multiple prices to fill large requests. If the session accepts the price or prices (e.g., at an average price), then it notifies leaning manager 102 to reserve the quantity. At which point, leaning manager 102 reserves the quantity and indicates it in reserved quantity column in table 200.

In an alternative embodiment, leaning manager 102 may use a pro rata system for allocating quantities to trading tools in a pro rata fashion. For example, when a first session requests quantity, the system could allocate the quantity to the session at the best prices. When a second session requests quantity, the system could reallocate a portion of the quantities at the best prices to the first session and could allocate another portion of the quantities at the best prices to the second session. Therefore, each session would have proportionate participation at the best prices. The system could use a price average mechanism for averaging out the prices if more than one market depth level is needed to satisfy the sessions' requests, and these prices may be used by the sessions in their trading strategy formulation.

Sometimes, the market may change (e.g., prices and quantities). If an available quantity changes to an amount that cannot satisfy the current reservation(s), then leaning manager 102 may notify the appropriate sessions of the change. The sessions may respond by making new requests and ultimately new reservations, if so desired.

In addition, there are some instances when the conditions in the market change, but the changes do not necessarily affect the actual price that was previously communicated to a session. Thus, to reduce the amount of communication, leaning manager 102 may be programmed to only notify a session when a change occurs to the price (or some other item of interest). So, for example, if quantities moved around in a particular market, but the average price remained the same, the session that is using the average price would not be notified.

Moreover, there are some instances when a leaning manager 102 may automatically move a reservation and notify the relevant session(s) of the move. For example, if a trader changes the priority of the reservation, then leaning manager 102 may move the reservation of one or more sessions and notify them accordingly to accommodate the change in priority. Of course, this is one example and leaning manager 102 might be programmed do this for any reason. This feature, like any feature described herein unless otherwise noted, may be programmed to turn on or off.

E. Example Process of Allocating Quantity

There are many ways to go about programming leaning manager 102, and each way depends on the desired functionality sought by the trader. To assist in understanding aspects of the present embodiments, some examples of how the leaning manager may be programmed are outlined directly below.

If so desired, a user programmable interface may be provided, and may include any type of interface that allows the user to communicate with the leaning manager 102. One example of a user programmable interface is a command-driven interface. Another example of a user programmable interface is a graphical user interface that takes advantage of computer graphics. The graphical user interface may include one or more windows that can be moved around the display screen, and their size and shape can be changed at will. A window might include icons that represent commands, files, or more windows. Of course, the present invention can use other types of user programmable interfaces, or alternatively, the present invention does not utilize a programmable interface of this type at all (e.g., hard-coded program, etc.).

In one embodiment, leaning manager 102 is programmed so that quantity is allocated to sessions on a first come, first serve basis. So, if a certain quantity is available at a desired price, the quantity will be allocated to those sessions that requested it first. For example, the first session to request quantity would reserve the quantity at the best price, and the second session to request quantity would reserve the quantity at the next best price, and so on. By allocating quantity in this manner, it can better assure that the session will get at least the price of the quantity it reserved or better, when a trade for the reserved quantity actually occurs. Therefore, in implementing a trading strategy, a session can count on the price given to it by leaning manager 102 and use it in its strategy formulation.

In another embodiment, leaning manager 102 may be programmed to accommodate other priority arrangements, such as basing the priority on a pro-rata configuration, basing it on the trading strategy, basing it on the software tool, basing it on the trader, and so on. Different types of priority schemes may be programmed into leaning manager 102 to achieve a desired result.

In one embodiment, when an event occurs, and a session wants to buy or sell the reserved quantity, it may do so. If the sessions act upon the quantities in the same manner as they were reserved, then each session may anticipate getting the quantity at the price it was reserved (unless a third party came along and took the quantity, however, in this case, leaning manager 102 would notify the sessions and each would preferably update their strategies accordingly).

Sometimes, however, the first session to request the quantity is not the first session to act upon it. Therefore, in one embodiment, leaning manager 102 may be programmed to allow the session that acts first to take the quantity at the best price. In other words, leaning manager 102 may operate on a first come, first serve basis for sessions ready to fire an order to a market. In doing so, leaning manager 102 may help assure that those sessions that need the quantity the most get the quantity at a price most desirable to the trader. Keep in mind that not every session may act upon its reserved quantity, and accordingly, this embodiment allows those that act first, get the quantity at the best prices. As a result, leaning manger 102 may notify the other sessions of the change. The sessions may respond by making new requests and ultimately new reservations. In other words, the sessions may use this information to adjust their trading strategy.

III. Example Implementation

As previously mentioned, there are many scenarios where a trading strategy may be watching or leaning on a product's available quantities and prices and plan to buy them as soon as a certain event occurs. An example of this activity may be seen in spreading.

Figure 4:
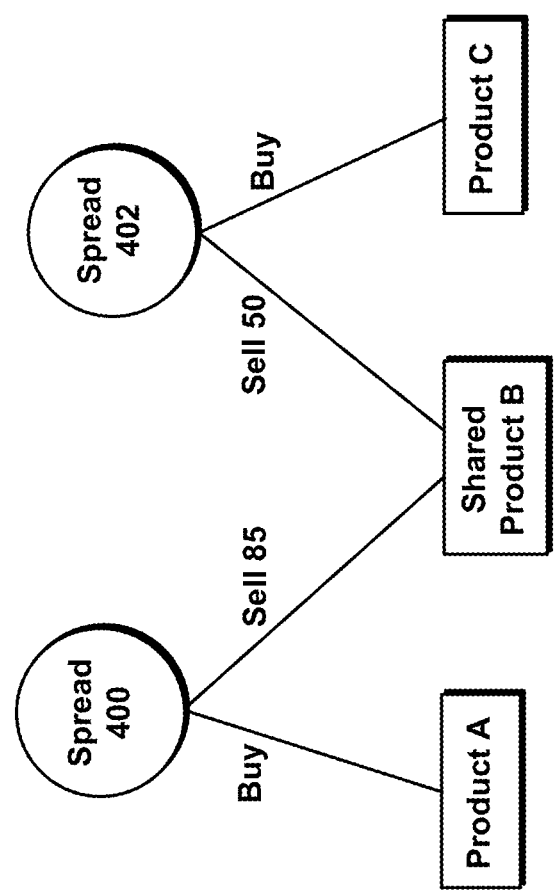

FIG. 4 is an illustration outlining two particular spread trading strategies. To assist the trader in executing the spread trading strategies, she has initiated two sessions on an automated spread trading tool. One session is working product A and product B to achieve or attempt to achieve spread 400, while the other session is working product C and product B to achieve or attempt to achieve spread 402. According to a preferred embodiment, leaning manager 102 assigns each session an ID (identification); the session that refers to spread 400 may be identified as "session A" and the session that refers to spread 402 may be identified as "session B." It should be understood that any type of ID or label might be used to identify the sessions.

Figure 6:
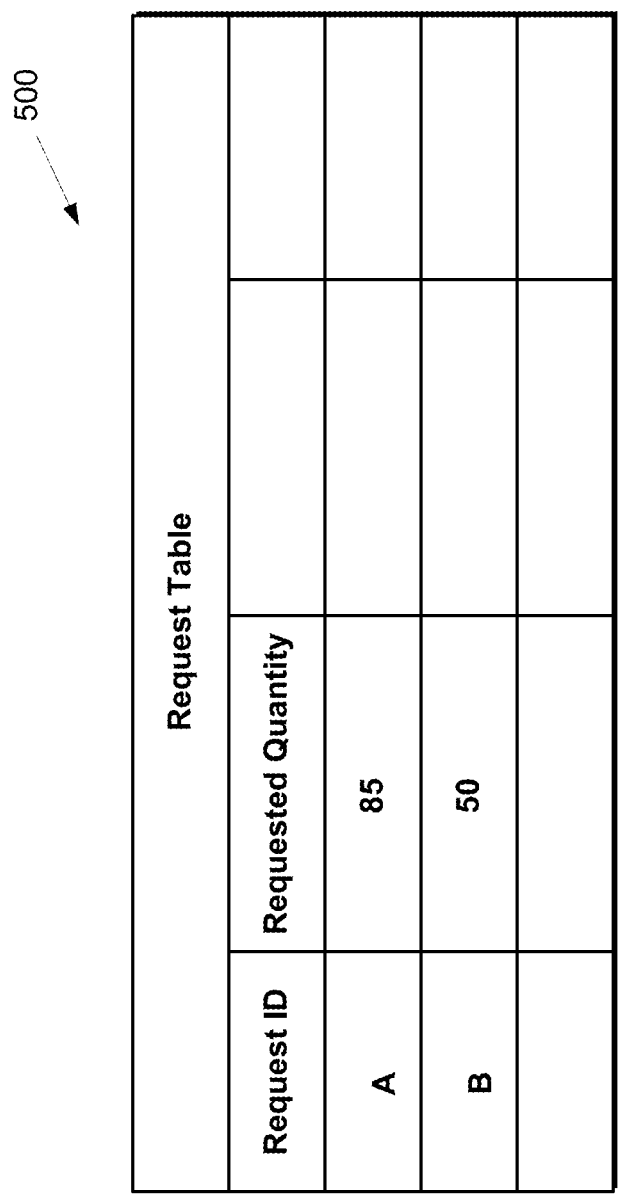

With respect to spread 400, assume that "session A" is attempting to buy spread 400 by buying product A and selling product B. To do this, "session A" might send an order to buy product A, and once that order is filled, it would send an offsetting order to sell product B, therefore completing spread 400. Ordinarily, "session A" may use market information from product B to determine where to price the order for product A. That way, when the order for product A is filled, "session A" may immediately fire an offsetting order to buy product B at market price or some other designated price point to achieve or attempt to achieve the spread. In this example, assume that "session A" is leaning on the bid quantity of "85" of product B. Referring briefly to FIG. 6, "session A" puts in a request to lean on "85" of product B. In other words, it is asking leaning manager 102 "At what price can I sell '85' of product B?"

With respect to spread 402, assume that "session B" is attempting to buy spread 402 by buying product C and selling product B. To do this, "session B" might send an order to buy product C, and once that order is filled, it would send an offsetting order to sell product B, therefore completing spread 402. "Session B" may use market information from product B to determine where to price the order for product C. In this example, "session B" is leaning on the bid quantity of "50" of product B. Referring briefly to FIG. 6, "session B" puts in a request to lean on "50" of product B. In other words, it is asking leaning manager 102 "At what price can I sell '50' of product B?"

Figure 5:
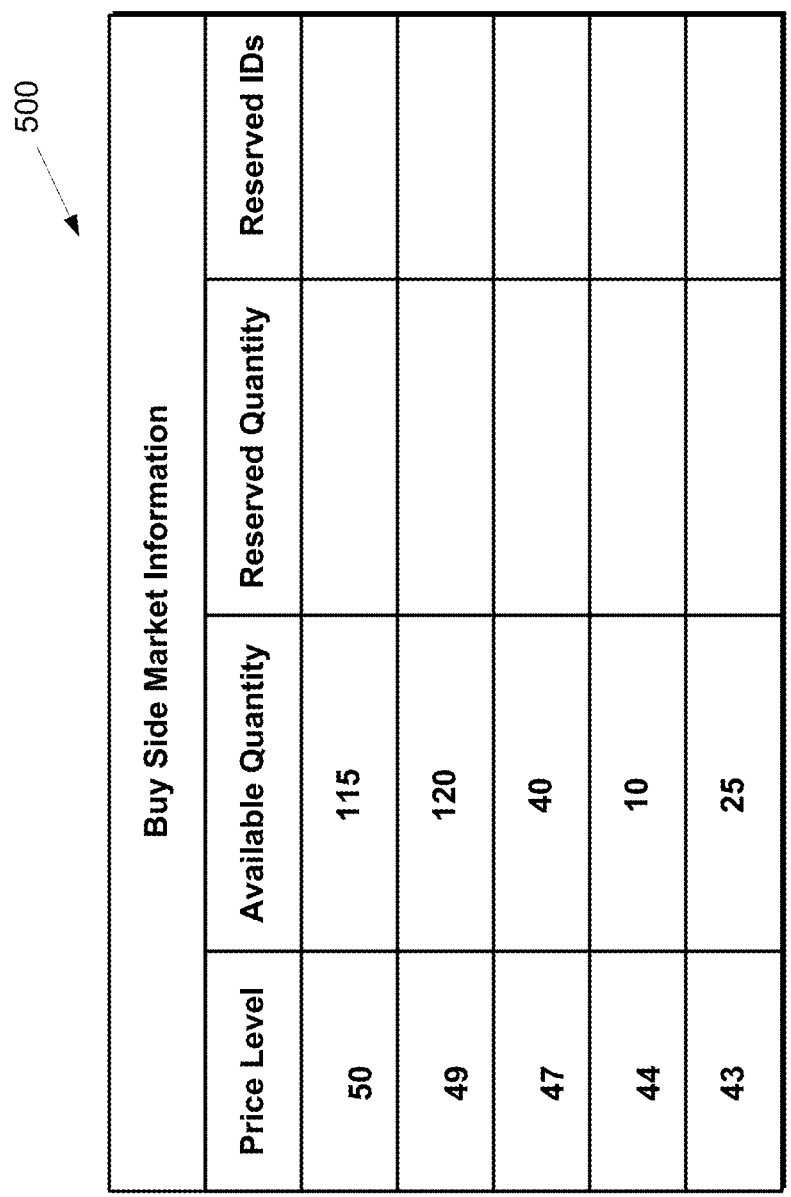

FIG. 5 shows a market information table 500 for the buy side of product B. Note that table 500 may also contain information for the sell side of product B, but has been left out for clarity in illustrating this particular working example. As such, leaning manager 102 receives and populates table 500 with current market information for product B. In this example, the electronic market provides five price levels of quantity, and currently, the "115" at "50" is the best bid for product B. Keep in mind that the market information in table 500 is preferably updated as new market information is received.

In response to the "session A" request, leaning manager 102 sends a notice to "session A" that "85" is available at "50." In other words, there are enough buyers (or buyer) such that "session A" could sell "85" at a price of "50." "Session A" may respond to leaning manager 102 by reserving the "85." Referring to table 500 in FIG. 6, leaning manager 102 marks the reservation. This indicates that "session A" has reserved "85" at a price of "50," and it may use this information to calculate where to price the order for product A, for example.

In response to the "session B" request, leaning manager 102 sends a notice to "session B" that "50" is available at "50" and "49." In other words, "session B" could sell "30" at a price of "50" and "20" at a price of "49." "Session B" may respond by reserving the "30" at a price of "50" and "20" at a price of "49," and it may use this information to calculate where to price the order for product C, for example. Referring again to table 500 in FIG. 6, leaning manager 102 marks the reservation as such.

FIG. 8 shows the market conditions have changed and now only "75" is available at "50." Preferably, leaning manager 102 notifies "session A" and "session B" of the change. In response to the notification, "session A" reserves "10" at a price of "49" in addition to its "75" at "50." Note that "session B" loses its reserved quantity at a price "50" as it was second in line behind "session A." To make up this lost quantity, "session B" may request more quantity at "49," which it does in this example. Both sessions may update their trading strategies to account for the market change. Leaning manager 102 may continue to coordinate with the sessions in response to market changes.

Now, let us assume that the order to buy product C was filled and "session B" sent an offsetting order to sell "50" of product B. According to a preferred embodiment, leaning manager 102 allows "session B" to get "50" at the better price of "50," instead of forcing "session B" to get "50" at the reserved price of "49." This programmed feature allows the trader to get a better price for spread 402 than expected. As a result, leaning manager 102 notifies "session A" of the market change (just as if an ordinary market change occurred). "Session A" can update its trading strategy accordingly. FIG. 8 shows the updated market conditions taking into account the selling of "50" of product B at a price of "50." Also, table 500 in FIG. 9 shows the updated reservations for "session A." According to table 500 in FIG. 9, "session A" now has "25" reserved at a price of "50," and "90" reserved at a price of "49."

The working illustrations directly above show an example implementation of a preferred embodiment. In particular, the working illustrations set forth some of the functionality that may be programmed into leaning manager 102. An advantage of the leaning manager 102 is its flexibility in being programmed to account for any situation or provide any desired result in coordinating the buying and/or selling of tradeable objects. In fact, one skilled in the art will appreciate the flexibility offered by leaning manager 102 to coordinate the buying and selling of tradeable objects in any desired fashion.

IV. Conclusion

The present embodiments include methods, systems, and computer program products that provide tools for use in electronic trading. The present embodiments allow a computer device, such as a trader's workstation or a gateway, to track and/or coordinate the buying and selling of tradeable objects. They provide an efficient way for multiple automated or semi-automated trading tools to track and/or coordinate their actions. This tracking and/or coordination may be used to enhance the trading strategies of each session.

Coordination may occur by any mechanism. According to one embodiment, the trading tools coordinate their actions using a reservation system, although any other organizational scheme may be used to facilitate coordination amongst a variety of trading tools. Regardless of the mechanism used in coordinating such activity, the present embodiments remain a flexible solution as they give a trader or an administrator, for example, the ability to program the coordination in any way that suits their particular needs.

It should also understood that the programs, processes, methods and systems utilized or described herein are not related or limited to any particular type of electronic trading environment or trading tools, unless indicated otherwise. In view of the wide variety of embodiments to which the principles of the present embodiments can be applied, it should be understood that the illustrated embodiments are examples only, and should not be taken as limiting the scope of the present invention. For example, more or fewer data attributes may be stored in the tables to accommodate various trading strategies.

The claims should not be read as limited to the described order or elements unless stated to that effect. All embodiments that come within the scope and spirit of the following claims and equivalents thereto are claimed as the invention.

What is claimed is:

1. A non-transitory computer readable medium having stored therein instructions executable by a processor, wherein the instructions are for coordinating and managing shared resources utilization by multiple trading sessions of a plurality of trading strategies in an electronic trading environment, and wherein the instructions are executable to:
   receive market information including an available quantity of a first tradeable object, wherein the market information is received from an electronic exchange, and wherein the available quantity reflects the quantity of the first tradeable object available at a plurality of price levels;
   populate a market information table, wherein populating the market information table comprises including the available quantity, wherein the available quantity is stored at each respective price level of the plurality of price levels;
   receive a first reservation request from a first trading session, wherein the first reservation request specifies a first lean quantity of the first tradeable object, wherein the first trading session is associated with a first trading strategy comprising a first tradeable object and a second tradeable object, wherein the first trading strategy leans on the first tradeable object and determines a price for an order to buy or sell the second tradeable object based on a lean price available for the first tradeable object;
   allocate a first portion of the available quantity stored in the market information table equal to the first lean quantity associated with the first trading session of the first trading strategy, wherein the first portion corresponds to a first price;
   update the market information table, wherein the instruction to update the market information table comprise instructions to (i) indicate in the market information table the first portion of the available quantity at the first price level, and (ii) indicate in the market information table an identifier associated with the first trading session to which the first portion of the available quantity was allocated, to reflect the allocation of the first portion of the available quantity at the first price level to the first trading session;
   generate the order for the second tradeable object based on a first definition for the first trading strategy, wherein the second trading strategy determines the price for the order to buy or sell the second tradeable object using the first price as the lean price for the first tradeable object;
   send the generated order for the second tradeable object over a computer network to an electronic exchange at which the second tradeable object is traded;
   receive a second reservation request from a second trading session, wherein the second reservation request is received after the first reservation request, wherein the second reservation request specifies a second lean quantity of the first tradeable object, wherein the second trading session is associated with a second trading strategy comprising the first tradeable object and a third tradeable object, wherein the second trading strategy leans on the first tradeable object and determines a price for an order to buy or sell the third tradeable object based on a lean price available for the first tradeable object also leaned on by the first trading session associated with the first trading strategy;
   allocate a second portion of the updated available quantity stored in the market information table equal to the second lean quantity associated with the second trading session of the second trading strategy, wherein the second portion corresponds to a second price and accounts for the first portion of the available quantity at the first price allocated to the first trading session based on the first reservation request recorded in the market information table, wherein accounting for the first portion of the available quantity at the first price already allocated to the first trading session results in preventing the second trading strategy from leaning on the first portion of the available quantity already allocated to the first trading session of the first trading strategy;
   update the market information table, wherein the instruction to update the market information table comprise instructions to (i) indicate in the market information table the second portion of the available quantity at the second price level, and (ii) indicating in the market information table an identifier associated with the second trading session to which the second portion of the available quantity was allocated, to reflect the allocation of the second portion of the available quantity at the second price level to the second trading session;
   generate the order for the third tradeable object based on a second definition of the second trading strategy, wherein the second trading strategy determines the price for the order to buy or sell the third tradeable object using the second price as the lean price for the first tradeable object; and
   send the generated order for the third tradeable object over a computer network to an electronic exchange at which the third tradeable object is traded.

2. The non-transitory computer readable medium of claim 1, wherein the first trading strategy and the second trading strategy are implemented by a common trading tool.

3. The non-transitory computer readable medium of claim 1, wherein the first trading strategy is implemented by a first trading tool and the second trading strategy is implemented by a second trading tool.

4. The non-transitory computer readable medium of claim 1, wherein the second tradeable object and the third tradeable object are the same tradeable object.

5. The non-transitory computer readable medium of claim 1, wherein the second tradeable object and the third tradeable object are different tradeable objects.

6. The non-transitory computer readable medium of claim 1, wherein the instructions are further executable to:
determine the allocation of the first and second portions based on a pro-rata allocation scheme.

7. The non-transitory computer readable medium of claim 1, wherein the instructions are further executable to:
determine the allocation of first and second portions allocation based on a first-in, first-out allocation scheme.

8. The non-transitory computer readable medium of claim 1, wherein the instructions are further executable to:
determine an update to the first price and the second price in response to a detected predetermined event.

9. The non-transitory computer readable medium of claim 8, wherein the predetermined event is based on an update to the market information for the tradeable object received from the electronic exchange.

10. The non-transitory computer readable medium of claim 8, wherein the predetermined event comprises a priority based event associated with at least one of the first trading strategy, the second trading strategy, and a third trading strategy.

11. The non-transitory computer readable medium of claim 1, wherein the instructions are further executable to:
provide the first price for the allocated first portion of the available quantity to the first trading strategy.

12. The non-transitory computer readable medium of claim 1, wherein the instructions are further executable to:
provide the second price for the allocated second portion of the available quantity to the second trading strategy.

13. The non-transitory computer readable medium of claim 1, wherein the second portion includes a third portion from a second available quantity.

14. The non-transitory computer readable medium of claim 13, wherein the second price is a weighted average price.

* * * * *